United States Patent [19]
DeGraaf

[11] 4,318,423
[45] Mar. 9, 1982

[54] EXTERNAL FLOWLINE ACROSS A UNIVERSAL JOINT

[75] Inventor: Douglas W. DeGraaf, Downers Grove, Ill.

[73] Assignee: Chicago Bridge & Iron Company, Oak Brook, Ill.

[21] Appl. No.: 160,003

[22] Filed: Jun. 16, 1980

[51] Int. Cl.³ .............................................. B63B 21/00
[52] U.S. Cl. .................................. 137/615; 141/388; 114/230; 441/5
[58] Field of Search ................ 137/615; 141/279, 387, 141/388; 114/230; 9/8 P; 285/114

[56] References Cited

U.S. PATENT DOCUMENTS

| | | | |
|---|---|---|---|
| 2,266,383 | 12/1941 | Quintrell | 285/264 |
| 3,614,869 | 10/1971 | Flory et al. | 114/230 X |
| 3,663,043 | 5/1972 | Walton | 285/113 |
| 3,700,014 | 10/1972 | Scales et al. | 141/388 |
| 4,010,500 | 3/1977 | Reid, Jr. | 9/8 P |
| 4,026,119 | 5/1977 | Dotti | 9/8 P X |
| 4,088,089 | 5/1978 | Flory | 114/230 |
| 4,155,670 | 5/1979 | Stafford | 285/264 X |
| 4,158,517 | 6/1979 | Foglia | 9/8 P X |

*Primary Examiner*—A. Michael Chambers
*Attorney, Agent, or Firm*—Merriam, Marshall & Bicknell

[57] ABSTRACT

Apparatus by which a fluid can be transported through a conduit from a first body to a second body joined together by a universal joint comprising first and second fluid swivels positioned about 90° from each other and with each swivel located exterior of, and axially in line with an axis of, a universal joint having two definable axes of rotation, an elbow conduit exterior of the universal joint having its ends connected to the two swivels, a first conduit extending out from the first swivel and secured to the first body, and a second conduit extending out from the second swivel and secured to the second body.

9 Claims, 4 Drawing Figures

EXTERNAL FLOWLINE ACROSS A UNIVERSAL JOINT

This invention relates to fluid transport in which two adjacent conduit portions are non-rigidly connected together in fluid tight operable communication. More particularly, this invention is concerned with apparatus by which a fluid conduit, secured to two objects which are non-rigidly connected together by a universal joint, can by-pass the universal joint.

BACKGROUND OF THE INVENTION

Many types of machines, apparatus and structural installations incorporate universal joints to non-rigidly connect together two adjacent objects when it is desired, or necessary, to have one or both of the objects pivot with respect to the other object, or to a third object. Such pivotal action is often involved even though there is no axial rotation as in a drive shaft.

At times a fluid conduit must extend from or between, and be secured to, objects connected together by a universal joint. Since the objects pivot with respect to one another at the universal joint, it is essential that the conduit include a non-rigid yieldable section at, or in the vicinity of, the universal joint which will not significantly interfere with the pivoting action between the objects.

There is much present interest in fluid conduit universal joint by-pass systems by oil companies engaged in offshore exploration, development and production. This is because such endeavors often require the utilization of a deep water offshore buoyant column or tower pivotally secured in place along its length by a universal joint. Oil or gas lines or conduits desirably run along the sea floor and then up the column to the column top. From the column top, oil or gas lines extend to a ship or structure moored to the column. The mechanism used to moor the ship or structure can include a universal joint at the column top so that the ship or structure is free to pitch and roll relative to the column. Since a fluid conduit must often extend from the column top to the ship or structure, it is necessary that the fluid conduit include a means by which fluid can be conveyed from a conduit on the column past the universal joint to a conduit on a mooring boom or yoke or to the ship or structure themselves.

Reid U.S. Pat. No. 4,010,500 discloses the use of a cardan type universal joint at the top and bottom of an offshore mooring column. The patent also discloses fluid coupling of a pipe from one side of the cardan joint to the other side by passing a conduit or pipe elbow through hollow pins of the cardan joint positioned 90° from each other. Conduit or pipe sections communicate with each end of the elbow through suitable fluid swivels so that pivotal movement of the column to the base, or the ship mooring yoke to the column, is unrestrained yet a fluid tight coupling between conduit sections is achieved.

Because of the 90° bend which the elbow must make inside of the cardan joint disclosed in the Reid U.S. Pat. No. 4,010,500, the joint must at times be sized larger than what is necessary to carry the axial, torsional and shear loads. Also, the sharp curve of the elbow internal of the cardan joint can restrict the pipe size which can be used and the sharp curve can prevent passage of a pig through the elbow, thereby making it impossible to clean the elbow without disassembly of the pipes. Furthermore, the Reid patent system is limited to conducting two flow lines or pipes from one side to the other side of the cardan joint.

SUMMARY OF THE INVENTION

According to the invention, there is provided apparatus by which fluids can be transported through a conduit from a first body to a second body joined together by a universal joint, having two definable axes of rotation, comprising first and second fluid swivels positioned about 90° from each other and with each swivel located exterior of, and axially in line with an axis of, the universal joint; an elbow conduit exterior of the universal joint having its ends connected to the two swivels; a first conduit extending out from the first swivel and secured in relation to the first body; and, a second conduit extending out from the second swivel and secured in relation to the second body.

Each axis of rotation of the universal joint can be in the same plane as in a cardan joint, or they can be located separate and spaced-apart. A ball and socket universal joint limited to two definable axes of rotation, such as disclosed in Stafford U.S. Pat. No. 4,155,670; Walton U.S. Pat. No. 3,663,043; and Quintell U.S. Pat. No. 2,266,383, can also be used in the subject invention. When a ball and socket universal joint of the described type is used, both axes will be in the same plane and will intersect at 90° as in a cardan universal joint. Of course, in all universal joints having two definable axes of rotation, the chosen axes of rotation will be at 90° to each other even if they are spaced-apart and do not intersect.

More than one elbow can be conducted around the universal joint by simply placing the second, third, etc. elbow swivels on the same axes of rotation as the swivels for the first elbow.

The elbow conduit ends are desirably in communication with the swivel ends closest to the universal joint although one or both of the elbow ends can be curved around to communicate with the swivel ends farthest from the universal joint.

It is possible, for specific types of universal joints, to directly or indirectly support the elbow by the universal joint structure in such a way that the weight of the elbow and external loads to which the elbow is subjected, will not be transmitted to the axes of the swivels.

In many applications of the invention at least one of the conduits in communication with the elbow will be located perpendicular to the axis of the swivel with which it communicates for fluid flow.

In a more specific embodiment of the invention, there is provided a buoyant column having a universal joint, having two definable axes of rotation, through which the column is secured in place in water by means anchored to a sea floor; each axis of the universal joint being about horizontal when the column is vertical; first and second fluid swivels positioned about 90° from each other and with each swivel located exterior of, and axially in line with an axis of, the universal joint; an elbow conduit exterior of the universal joint having its ends connected to the two swivels; a first conduit extending out from the first swivel and up to the column to which it is secured; and, a second conduit extending out from the second swivel and directed away from the column.

DETAILED DESCRIPTION OF THE DRAWINGS

So far as it is practical, the same numbers will be used to identify the same elements or parts.

Figure 1:
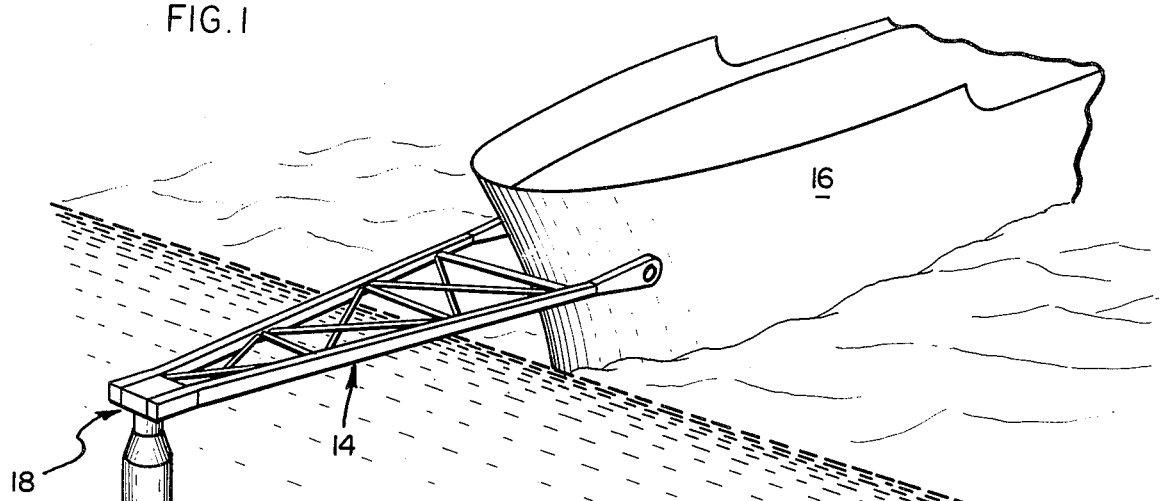
FIG. 1 is an isometric view of an offshore seafloor-supported fluid loading column having a tanker moored to it.
Figure 2:
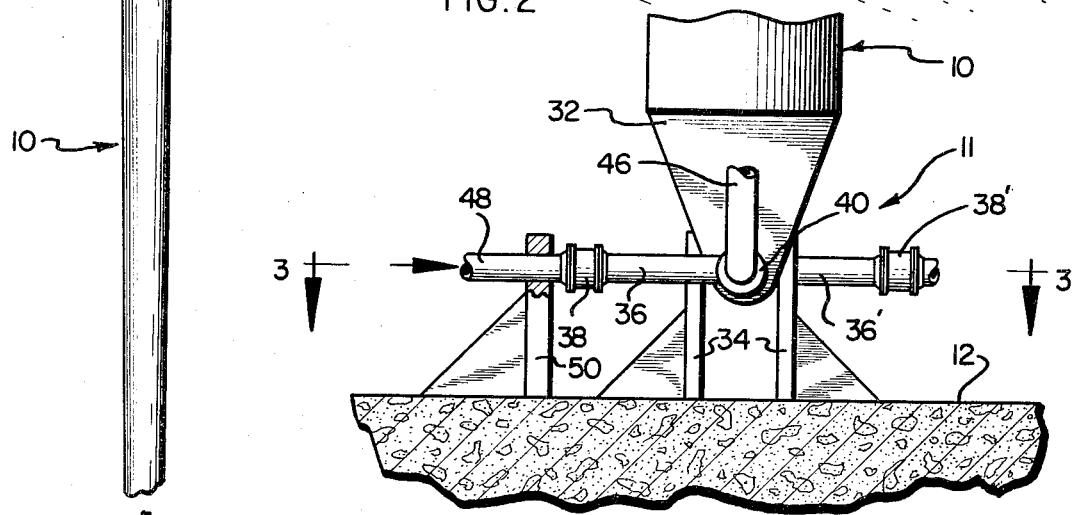
FIG. 2 is an elevational view of two fluid conduits by-passing the universal joint at the bottom of the column shown in FIG. 1.

With reference to FIG. 1, the offshore fluid loading column 10 is connected by a universal joint 11 to base 12 secured to a seafloor. A ship mooring yoke 14 is pivotally connected at one end to tanker 16. The other end of yoke 14 is connected by a universal joint 18 to the top of column 10, thereby permitting the tanker 16 to pitch and roll. In addition, the top of the column is provided with a rotary turret, now shown, or similar swivel which will permit the tanker 16 to weathervane 360° around the column.

The universal joint 11 shown in FIGS. 1 to 4 is a cardan joint having two axes 22 and 24 which intersect each other at 90° in the same plane. The cardan joint has a block 26 from which the two pins 28 extend axially outwardly from opposing sides. Similarly, the two pins 30 extend axially outwardly from the other two sides of block 26.

The two spaced-apart legs 32 project downwardly from the lower end of column 10. Each leg 32 has a hole at the lower end containing a bearing. The pins 28 are rotatably received in those bearings. As a result, the column 10 can pivot about the axis 22, which would be horizontal to the sea floor when the column is vertical.

Extending upwardly from base 12 are two spaced-apart supporting arms 34 which have axially aligned holes at the top containing bearings in which the two pins 30 are rotatably positioned.

Elbow 36 extends from fluid swivel 38 to fluid swivel 40. Tube 42 is joined axially to pin 30 and to elbow 38 so as to be aligned axially to fluid swivel 38. Similarly, tube 44 is joined axially to pin 28 and, in addition, it is joined to elbow 36 so as to be aligned axially with fluid swivel 40.

Conduit 46 extends from swivel 40 and curves upwardly into support by column 10. As a result, when column 10 rotates on axis 22 (pins 28) the rotation is transferred to swivel 40 but not to elbow 36.

Conduit 48 extends from swivel 38 and it is supported by conduit anchor 50 on base 12. Pipe 48 is thus held stationary when column 10 pivots about axis 24 (pins 30). Pivoting about axis 24 can take place because the end of elbow 36 can rotate in swivel 38. Pipe 46 does not restrict that pivoting since it is secured to column 10. Pipe 46, however, does cause elbow 36 to rotate simultaneously with the column when there is pivoting about axis 24.

A similar second conduit by-pass of the universal joint 11 can be installed like the one described above by placing an elbow 36' on the other side of elbow 36, and connecting elbow 36' to fluid swivels 38' and 40' which correspond to swivels 38 and 40. Tube supports 42' and 44', corresponding to supports 42 and 44, can also be used to join elbow 36' to pins 30 and 28 respectively. A conduit (not shown) would extend from swivel 40' upwardly in a manner similar to conduit 46. Also, a conduit (not shown) could extend from swivel 38' to a support on base 12 to keep that conduit stationary when the end of elbow 36' rotates in swivel 38'.

Figure 3:
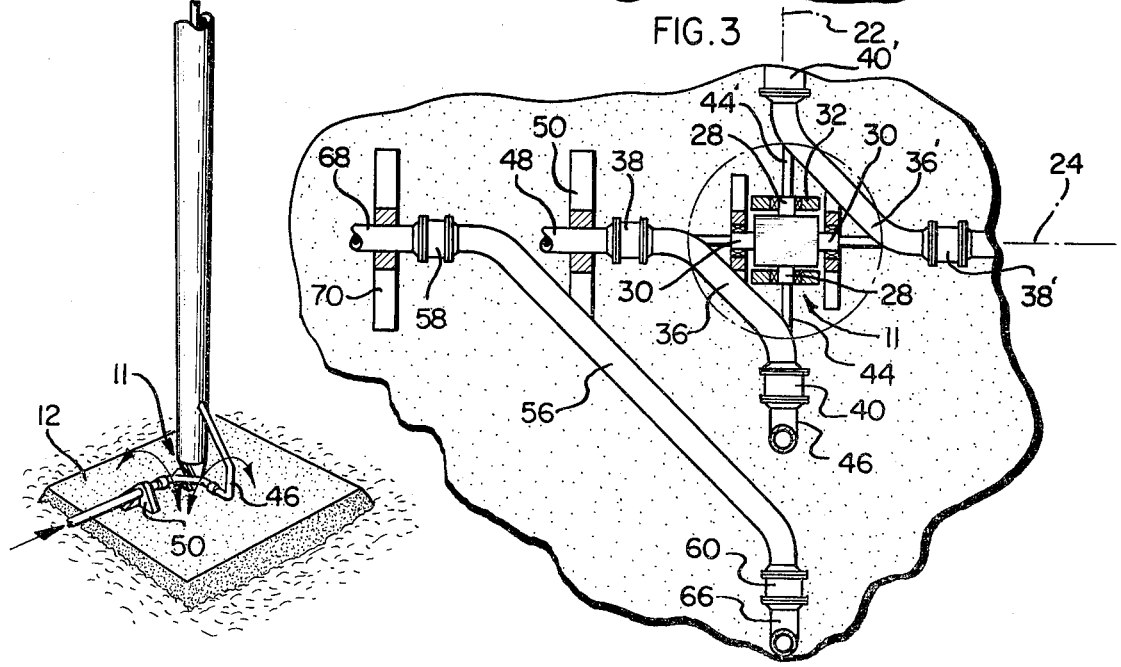
FIG. 3 is a sectional view taken along the line 3—3 of FIG. 2 with a third conduit included for additional illustration.
Figure 4:
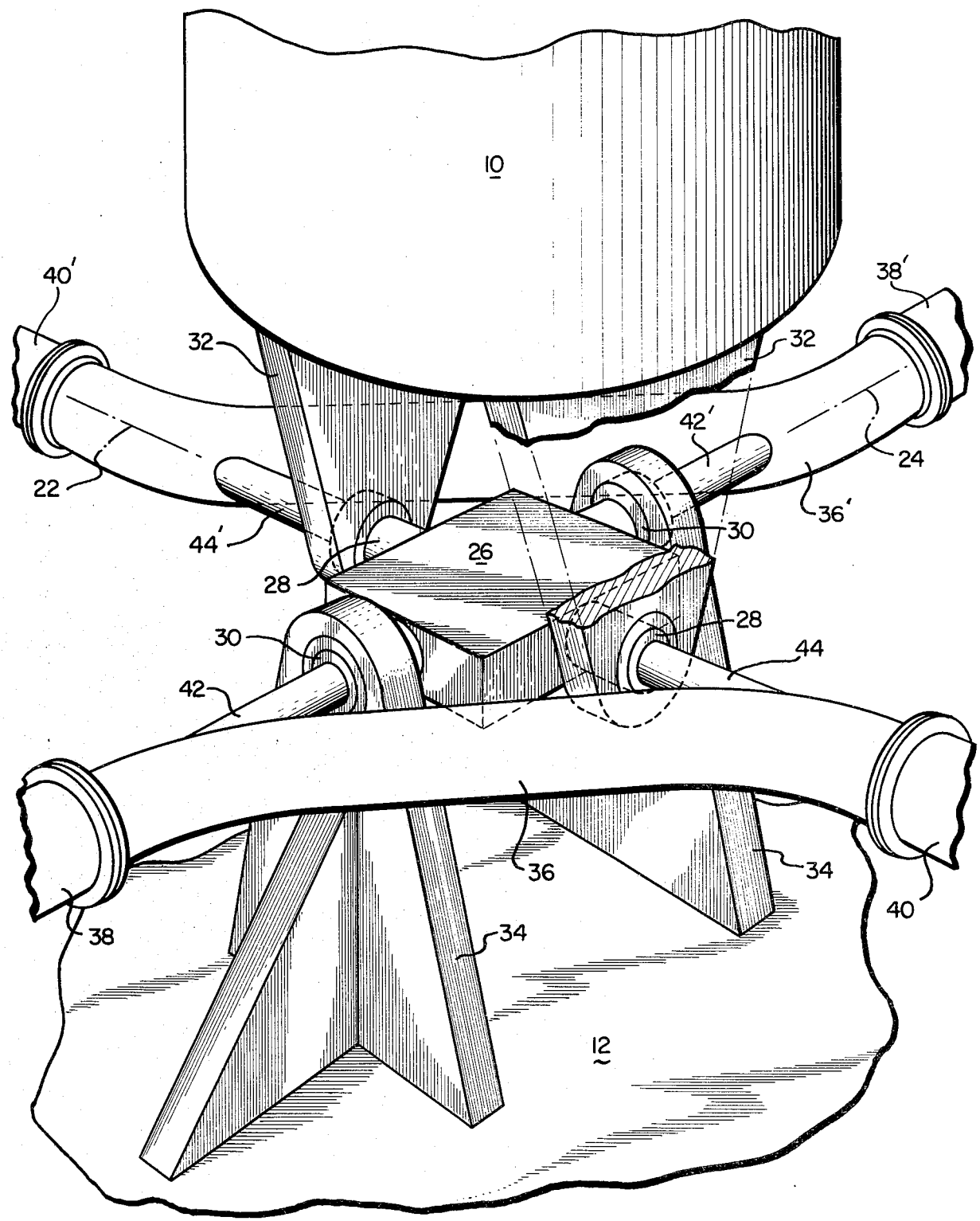
FIG. 4 is an enlarged isometric view of two fluid conduits by-passing the universal joint shown in FIGS. 2 and 3.

FIG. 3 illustrates how a third conduit can bypass universal joint 11. Elbow 56 is connected at its ends to fluid swivels 58 and 60. Swivel 58 is aligned on axis 24 and swivel 60 is aligned on axis 22. Conduit 66 extends upwardly from swivel 60 into supporting engagement with column 10 so that when the column pivots on axis 24 the pivoting action is accommodated by swivel 58. Stationary conduit 68 is connected to swivel 58 and it is secured in place by support 70 on base 12. When the column 10 pivots on axis 22, the end of conduit 66 pivots in swivel 60 with elbow 56 stationary.

In the above description of FIG. 3, it should be understood that conduits 48 and 68 can bend or curve in any desirable direction and need not be maintained on axis 24 after they leve their respective swivel connections.

It is believed clear from the above that there is no theoretical limit to the number of conduit by-passes of universal joint 11 which can be installed.

Although the specific embodiments of the invention illustrate by-pass systems for conveying a fluid, whether it be gas or liquid, it will be appreciated that a similar arrangement of apparatus can be used to make an electric cable by-pass of the universal joint.

The foregoing detailed description has been given for clearness of understanding only, and no unnecessary limitations shoiuld be understood therefrom, as modifications will be obvious to those skilled in the art.

What is claimed is:

1. Apparatus by which a fluid can be transported through a conduit from a first body to a second body joined together by a universal joint comprising:

said first body and said second body being joined together by neons defining said universal joint having two definable axes of rotation, first and second fluid swivels positioned about 90° from each other and with each swivel located exterior of and axially in line with a respective axis of the universal joint, an elbow conduit exterior of the universal joint having its ends connected to the two swivels, a first conduit extending out from the first swivel and secured to the first body, and a second conduit extending out from the second swivel and secured to the second body.

2. Apparatus according to claim 1 in which both axes of the universal joint are in the same plane.

3. Apparatus according to claim 2 in which the universal joint is a cardan joint.

4. Apparatus according to claim 3 in which the elbow is supported by the cardan joint such that elbow weight and external loadings are not transmitted to the swivels.

5. Apparatus according to claim 1 in which the first conduit is about perpendicular to the first swivel axis.

6. A buoyant column having a universal joint with two definable axes of rotation through which the column is secured to place in water by means anchored to a sea floor, means joining said column and said means anchored to said sea floor defining said universal joint, each axis of the universal joint being about horizontal when the column is vertical, first and second fluid swivels positioned about 90° from each other and with each swivel located exterior of and axially in line with a respective axis of the universal joint, an elbow conduit exterior of the universal joint having its ends connected to the two swivels, a first conduit extending out from the first swivel and up to the column to which it is secured, and a second conduit extending out from the second swivel and directed away from the column.

7. A column according to claim 6 in which both axes of the universal joint are in the same plane.

8. A column according to claim 7 in which the universal joint is a cardan joint.

9. A column according to claim 6 in which the first conduit is about perpendicular to the first swivel axis.

* * * * *

UNITED STATES PATENT AND TRADEMARK OFFICE
CERTIFICATE OF CORRECTION

PATENT NO. : 4,318,423
DATED : March 9, 1982
INVENTOR(S) : DOUGLAS WARREN DE GRAAF It is certified that error appears in the above-identified patent and that said Letters Patent are hereby corrected as shown below:

Column 4, line 26, change "leve" to --leave--; line 43, change "neons" to --means--; line 66, change "to place" to --in place--; and in line 67, start a paragraph with "means joining".

Signed and Sealed this

Eleventh Day of May 1982

[SEAL]

Attest:

Attesting Officer

GERALD J. MOSSINGHOFF

Commissioner of Patents and Trademarks